(12) United States Patent
Vojnovic (10) Patent No.: US 11,831,210 B2
(45) Date of Patent: Nov. 28, 2023

(54) NON-COGGING HIGH EFFICIENCY ELECTRIC GENERATOR

(71) Applicant: Mirko Dusan Vojnovic, Campbell, CA (US)

(72) Inventor: Mirko Dusan Vojnovic, Campbell, CA (US)

(*) Notice: Subject to any disclaimer, the term of this patent is extended or adjusted under 35 U.S.C. 154(b) by 46 days.

(21) Appl. No.: 17/713,120

(22) Filed: Apr. 4, 2022

(65) Prior Publication Data

US 2022/0337142 A1 Oct. 20, 2022

Related U.S. Application Data

(60) Provisional application No. 63/176,452, filed on Apr. 19, 2021.

(51) Int. Cl.
*H02K 16/02* (2006.01)
*H02K 21/12* (2006.01)
*H02K 3/12* (2006.01)
*H02K 1/2792* (2022.01)
*H02K 1/2783* (2022.01)

(52) U.S. Cl.
CPC ........... *H02K 16/02* (2013.01); *H02K 1/2783* (2022.01); *H02K 1/2792* (2022.01); *H02K 3/12* (2013.01); *H02K 21/12* (2013.01)

(58) Field of Classification Search
CPC ............................... H02K 16/02; H02K 21/12
USPC ........................................................ 310/156
See application file for complete search history.

(56) References Cited

U.S. PATENT DOCUMENTS

| 7,839,048 | B2* | 11/2010 | Jansen | H02K 1/146 310/58 |
| 8,659,205 | B2* | 2/2014 | Moura | H02K 7/09 310/216.069 |
| 2004/0245879 | A1* | 12/2004 | Hirzel | H02K 21/24 310/156.01 |
| 2013/0113318 | A1* | 5/2013 | Nishiyama | H02K 21/44 310/114 |

FOREIGN PATENT DOCUMENTS

DE 102016208259 A1 * 11/2017
WO WO-2018054554 A1 * 3/2018 ............... H01F 7/02

OTHER PUBLICATIONS

WO-2018054554-A1 Machine Translation (Year: 2018).*
DE-102016208259-A1 Machine Translation (Year: 2017).*

* cited by examiner

*Primary Examiner* — Quyen P Leung
*Assistant Examiner* — Masoud Vaziri (57) ABSTRACT

The invention relates to a non-cogging electric generator having at least one stator and at least one dual rotor, wherein the dual rotor comprises a plurality of primary magnet devices arranged in circular Halbach array. Non-cogging is achieved by having inner and outer rotor rotating synchronously. Concentration of magnetic flux is achieved by magnetic devices tapering into pyramidal shape, such that magnetic devices arranged on the inner rotor are facing magnetic devices on the outer rotor, whereas said magnetic devices are facing each other with the opposite polarity. Stator comprises electrical wire windings and is positioned between inner and outer rotor.

5 Claims, 9 Drawing Sheets

Circular Halbach array

Fig. 7

Pyramidal magnet

Fig. 8

Pyramidal magnet pair poles
- side view -

Fig. 9

Strong Side

Weak Side

NON-COGGING HIGH EFFICIENCY ELECTRIC GENERATOR

CROSS-REFERENCE TO RELATED APPLICATIONS

This application claims the benefit of U.S. Provisional Application No. 63/176,452, filed 19 Apr. 2021 for Non-Cogging High Efficiency Electric Generator, which is incorporated by reference in entirety.

TECHNICAL FIELD

The present invention relates to the field of energy generation, and more particularly to a system and method for generating power utilizing permanent magnets.

BACKGROUND ART

The following is tabulation of some prior art that presently appears relevant:

| Patent Number | U.S. Patent Issue Date | Patentee |
| --- | --- | --- |
| U.S. Pat. No. 9,245,677B2 | 2016 Jan. 26 | Fullerton et al. |
| Patent Number | U.S. Patent Issue Date | Patentee |
| U.S. Pat. No. 5,70,5902 | 1998 Jan. 06 | Bernard T. Merritt et al. |
| Patent Number | Patent Issue Date | Patentee |
| U.S. Pat. No. 2016/0164353A1 | 2016 Jun. 09 | Roberto Sanchez Catalan |
| Patent Number | Country Patent Issue Date | Patentee |
| DE 10 2007 056 116 B4 | Germany 2011 Dec. 29 | Andreas et al. |

Energy demands of the modern society has made the way open to invest great amount of technological effort and capital to renewable energies. Wind energy is one of the renewable energies which have attracted a lot of interest in recent years. This interest has led to many technological advancements in induction machines and permanent magnet generators. Most early wind turbines were designed using a Squirrel Cage Induction Generator (SCIG) with close to fixed speed and directly connected to the grid, as was used during the 1980s and 1990s in stall-regulated wind systems. That design has been phased out due to several disadvantages, such as non-controllable speed, gearbox complexity, and excitation current from the grid. Later in the mid-1990s, the "Optislip" concept, which uses Wound Rotor Induction Generator (WRIG) with an external resistor bank connected to the rotor and power electronic circuitry to implement rotor current control was applied. Currently, the well-known Doubly-Fed Electric Machine (DFIG) has become the industry standard for today's on-shore wind turbines. It is a variable speed turbine system with a wound rotor induction generator and a partial scale converter, which controls the rotor speed. A multistage gearbox, normally a three-stage gearbox, is used in the drive train.

In recent years, due to price drop of strong rare earth permanent magnets new research and development of permanent magnet generators has taken place.

Some prior art proposed solutions to achieving higher efficiency of concentrated permanent magnet magnetic flux—for example, in U.S. Pat. No. 9,245,677 B2 to Fullerton et al. (2016) an improved system for concentrating magnetic flux of a multi-pole magnetic structure is proposed, where the surface of a ferromagnetic target uses pole pieces having a magnet-to-pole piece with a first area and a pole piece-to-target interface with a second area substantially smaller than the first area for concentrating flux of the multi-pole magnetic structure.

U.S. Pat. No. 5,705,902 to Bernard T. Merritt et al. (1998) discloses a new configuration of DC motor/generator based on a Halbach array of permanent magnets. This motor does not use ferrous materials so that the only losses are winding losses and losses due to bearings and windage. The rotating portion, i.e., the rotor, is on the outside of the machine. The stationary portion, i.e., the stator, is formed by the inside of the machine. The rotor contains an array of permanent magnets that provide a uniform field. The windings of the motor are placed in or on the stator. The stator windings are then "switched" or "commutated" to provide a DC motor/generator much the same as in a conventional DC motor. The commutation can be performed by mechanical means using brushes or by electronic means using switching circuits.

US patent US2016/0164353A1 to Roberto Sanchez Catalan (2016) discloses Halbach array electromagnetic device with electromagnetic cores in Halbach array sequence. This electromagnetic device may also include permanent magnets in Halbach array in addition to at least one Halbach array of electromagnets. It further includes configurations wherein enhanced magnetic forces of the Halbach arrays are paired. The embodiments disclosed utilize electromagnets arranged in Halbach Array configuration having magnetic flux conduits that provide substantial contiguity between adjacent electromagnetic cores in order to fully enable the Halbach effect and achieve increases in efficiency and power.

German patent DE 10 2007 056 116 B4 to Andreas et al. (2011) discloses an invention of routing of a magnetic flux in an electric machine. It shows a transversal flux machine with conductor rings, which are surrounded by U-shaped, soft magnetic bodies from three sides, wherein a magnetic circuit of hard magnetic parts is periodically closed. These parts are separated from the respective U-shaped, soft-magnetic body by two air gaps arranged radially outside the conductor rings. The magnetically active parts of the rotor or stator are partially disposed axially within the ends of the U-shaped soft magnetic body.

I have found that the disadvantage of the prior art is that:
  (a) There are limitations in the above mentioned designs due to their complexity; both mechanically and electrically, thus increased cost of manufacturing.
  (b) Existing systems suffer from inefficiency due to losses in iron core that is used to guide magnetic flux through electrical windings. Such losses manifest themselves as dissipated heat due to eddy currents and increased resistance to rotational momentum, also known as cogging.
  (c) Since ferromagnetic materials, including iron and steel have greater material density than neodymium magnets, they have greater mass and require more force to sustain motion.
  (d) Some existing systems utilize rotor steel plates to minimize magnetic flux leakage on the outer side of the rotor (side not facing stator). Such steel plates increase mass of the rotor and require greater force to start and maintain rotation.

(e) Existing systems with simplified architectures without rotor steel plates exhibit flux leakage and such non-concentrated flux leads to diminished efficiency.

SUMMARY

In accordance with one embodiment a Non-Cogging High Efficiency Electric Generator for generating inexpensive power is presented. It comprises at least one inner rotor and at least one outer rotor rotating synchronously, and at least one stator with coils. Inner rotor and outer rotor utilize pyramidal shaped magnets to focus magnetic flux to a point and absence of iron core makes it possible to eliminate cogging. Addition of Halbach magnets provides for guided magnetic path and minimizes flux leakage. Such configuration increases electrical and mechanical efficiency of the apparatus.

Advantages

To overcome loss of efficiency due to cogging, proposed invention employs dual rotor configuration having inner and outer rotor rotating synchronously. Opposing magnets remain always in the same relative position which eliminates variations in magnetic field.

Stator windings are wound on non-magnetic, non-metal, material so cogging interaction between magnets and stator metal core is eliminated.

Magnetic flux being routed utilizing circular Halbach array combined with pyramidal magnets results in concentration of magnetic flux at the tip of the magnet pyramid pole. Such concentrated flux flows through the center of stator windings with minimal dispersion and loss.

Since rotor design does not require usage of steel (used in some designs to minimize stray magnetic fields of permanent magnets), resulting in lesser material density and mass, such rotor requires less force to sustain motion.

Advantages of one or more aspects of the proposed invention in maximizing magnetic flux flow through stator windings without cogging, thus increasing efficiency of the generator will be apparent from a consideration of ensuing description.

DESCRIPTION OF THE DRAWINGS - REFERENCE NUMERALS

| | | | |
|---|---|---|---|
| 102 | inner rotor | 104 | outer rotor |
| 106 | stator windings | 108 | outer rotor pyramidal magnet |
| 110 | outer rotor Halbach magnet | 112 | inner rotor pyramidal magnet |
| 114 | inner rotor Halbach magnet | 116 | stator |
| 202 | pyramidal magnet focusing flux | 302 | pyramidal magnet north pole tip |
| 304 | pyramidal magnets south pole tip | 402 | Halbach array flux flow |
| 502 | axial generator dual rotor | 504 | axial generator stator |
| 506 | axial generator pyramidal magnets | 508 | axial generator stator windings |
| 602 | pyramidal magnet | 604 | Halbach magnet |
| 702 | step pyramidal magnet construction | 802 | north pole tip pyramidal magnet |
| 804 | south pole tip pyramidal magnet | 902 | circular array pyramidal magnet |
| 904 | circular array Halbach magnet | 906 | circular Halbach array strong side |
| 908 | circular Halbach array weak side | | |

DETAILED DESCRIPTION

FIGS. 1-4—First Embodiment

Figure 1:
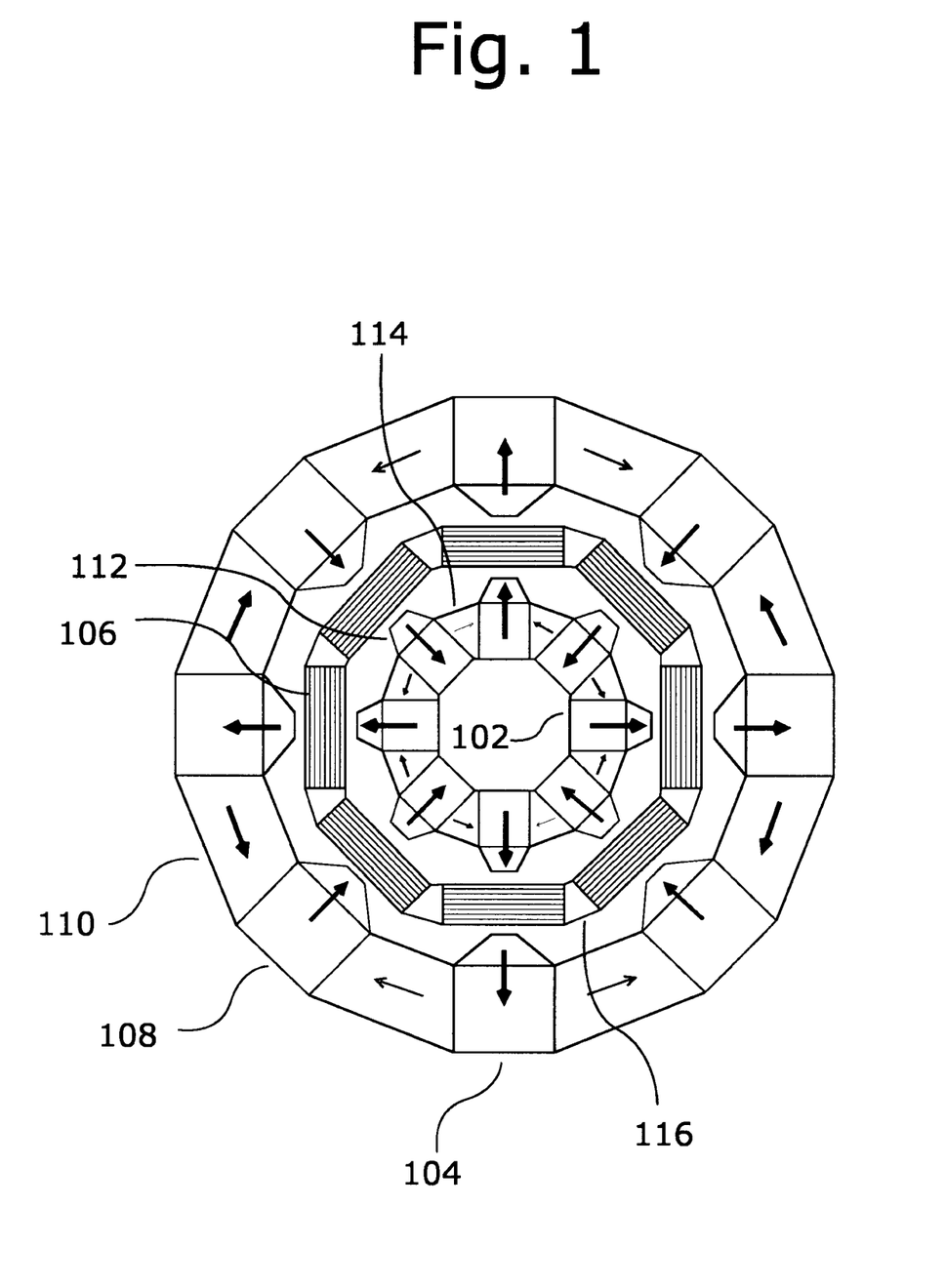
FIG. 1 shows components of radial Non-Cogging High Efficiency Electric Generator.

One embodiment of Non-Cogging High Efficiency Electric Generator is illustrated in FIG. 1 (radial Non-Cogging High Efficiency Electric Generator). Non-Cogging High Efficiency Electric Generator comprises inner rotor 102 (FIG. 1), outer rotor 104, stator 116, plurality of stator windings 106, plurality of outer rotor pyramidal magnetic devices 108, plurality of outer rotor Halbach magnetic devices 110, plurality of inner rotor pyramidal magnetic devices 112, and plurality of inner rotor Halbach magnetic devices 114.

Said inner rotor 102 and said outer rotor 104 comprise dual rotor. Said plurality of outer rotor pyramidal magnetic devices 108, said plurality of outer rotor Halbach magnetic devices 110, said plurality of inner rotor pyramidal magnetic devices 112, and said plurality of inner rotor Halbach magnetic devices 114 comprise magnetic means.

Inner rotor 102 consists of plurality of pyramidal magnetic devices 112 and plurality of Halbach magnetic devices 114 mechanically connected together to form circular Halbach array. Outer rotor 104 consists of plurality of pyramidal magnetic devices 108 and plurality of Halbach magnetic devices 110 mechanically connected together to form circular Halbach array. Both, inner rotor 102 and outer rotor 104 are mechanically coupled to the same rotating shaft so their relative position doesn't change. Dual rotor comprises inner rotor 102 and outer rotor 104. Said plurality of inner rotor pyramidal magnetic devices 112 and plurality of outer rotor pyramidal magnetic devices 108 form pole pairs of the Non-Cogging High Efficiency Electric Generator. Number of pluralities of pole pairs varies and is determined by particular design specifications.

Plurality of stator windings 106 are mechanically connected to stationary stator and electrically connected to form electrical output of Non-Cogging High Efficiency Electric Generator. Said plurality of stator windings 106 is electrically connected in series, or in parallel, or in star configuration, or in delta configuration, or dynamically varied configuration, or any other configuration that is determined by design specifications. Said plurality of stator windings 106 is wound with single wires, double wires, litz wires, or any combination and number of wires determined by design specifications. Said plurality of stator windings 106 can be dynamically switched to any configuration and/or number of parallel wires on the same winding if required by design specifications and working conditions. Number of stator windings 106 is determined by Non-Cogging High Efficiency Electric Generator's desired power output and can be equal to the number of rotor pole pairs, or different from the number of rotor pole pairs, as determined by design specifications.

Inner rotor 102 and outer rotor 104 of this embodiment can be made of, but is not limited to plastics, plastic composites, Kevlar, carbon fiber, glass fiber, wood composites, ceramics, ceramic composites and combinations, metal particle or ceramic particle filled plastic, and combinations thereof, or any other material in which eddy currents cannot be induced. Inner rotor 102 and outer rotor 104 of this embodiment can made to conform, but is not limited to radial, axial, or any other generator configuration as determined by design specifications.

Said pyramidal magnetic devices 108 and 112 and Halbach magnetic devices 110 and 114 of this embodiment can be made of, but is not limited to ceramic magnets, Alnico magnets, samarium cobalt (SmCo) magnets or neodymium iron boron (NdFeB) magnets. Shape of said pyramidal magnetic devices 108 and 112 of this embodiment used to form pole pairs can be, but is not limited to pyramidal, step pyramidal, truncated pyramidal, truncated step pyramidal, conical, step conical, truncated conical, truncated step conical, tetrahedron, truncated tetrahedron, octahedron, truncated octahedron, arc, oloid, sphericon, or any other shape that tapers into pointed top of the magnet pole.

Stator 116 of this embodiment can made of, but is not limited to plastics, plastic composites, Kevlar, carbon fiber, glass fiber, wood composites, ceramics, ceramic composites and combinations, metal particle or ceramic particle filled plastic, and combinations thereof, or any other material in which eddy currents cannot be induced.

Stator windings 106 of this embodiment can be wound with, but is not limited to single wires, double wires, litz wires, or any combination and number of wires determined by design specifications.

Plurality of stator windings 106 of this embodiment can be electrically connected in, but is not limited to series, or in parallel, or in star configuration, or in delta configuration, or dynamically varied configuration, or any other configuration that is determined by design specifications.

Number of inner and outer rotor's magnetic devices' poles and stator windings of this embodiment can be variable and can be optimized for specific design.

Number of rotor poles and stator windings of this embodiment does not need to be equal to each other and can be optimized for specific design.

Operation—FIGS. 1-4

Rotation of the dual rotor is provided the by outside rotational force. Rotation of the dual rotor induces electric current to flow through an electrical conductor in an induced magnetic field and provides conversion of mechanical energy into electrical energy.

To overcome loss of efficiency due to cogging, proposed invention employs dual rotor configuration having inner rotor 102 and outer rotor 104 rotating synchronously, so the opposing magnetic devices remain always in the same relative position. Stator windings 106 are wound on non-magnetic, non-metal, material so cogging interaction between magnetic devices and stator metal core is also eliminated. FIG. 1 shows the preferred embodiment of the invention.

Several important principles are explained below:

Cogging

Cogging is a major contributor to lowering efficiency of permanent magnet motors. Cogging in electrical motors is the reactive torque due to the interaction between the permanent magnets of the rotor and the stator (or permanent magnets of the rotor and iron core of stator windings) of a Permanent Magnet (PM) machine. It is also known as detent or 'no-current' reactive torque. To overcome this reactive torque more of the outside force must be applied to overcome its effects, thus lower efficiency of the motor.

This torque is position dependent and its periodicity per revolution depends on the number of magnetic poles and the number of teeth on the stator. Cogging torque is especially prominent at lower speeds, with the symptom of jerkiness.

Generated Current

Electric current is only induced in a coil of wire if the magnetic field is moving relative to the coil. Faraday's Law gives the electromotive force (EMF) ε produced in a coil by a magnetic field:

$$\varepsilon = N \times d\phi/dt$$

where:

N—number of wire loops in coil winding
ϕ—magnetic flux
t—time

In other words, the EMF (electric potential) induced in the coil is directly proportional to the rate of change of flux and the number of loops in stator windings 106.

In practice, this means that if the coil is stationary relative to the magnetic field, no EMF is induced and vice versa.

Now, we are left with solving the problem of magnetic flux dispersion. This is achieved by two approaches:
1. Increasing magnetic flux density and focusing flux to a point.
2. Providing guided magnetic flux return paths to minimize dispersion flux losses (stray field) due to random return paths through surrounding air.

Magnetic Flux Density and Focusing Flux to a Point

Increase in magnetic flux density in step pyramidal configuration is taking advantage of two physical properties of materials through which magnetic flux propagates.
1.) Magnetocrystalline anisotropy by which magnetic field propagates along the principal axes of magnet's crystal lattice and is manifested by locking magnetic moments in certain crystallographic directions. In this particular case, it is parallel with vertical axes of pyramid's symmetry.
2.) Different magnetic resistance of air and ferromagnetic material of the magnet. Aft has much higher magnetic resistance then ferromagnetic material, so magnetic flux continues to travel through the ferromagnetic materiel towards the top of pyramid, effectively increasing magnetic flux density along the path.

Figure 2:
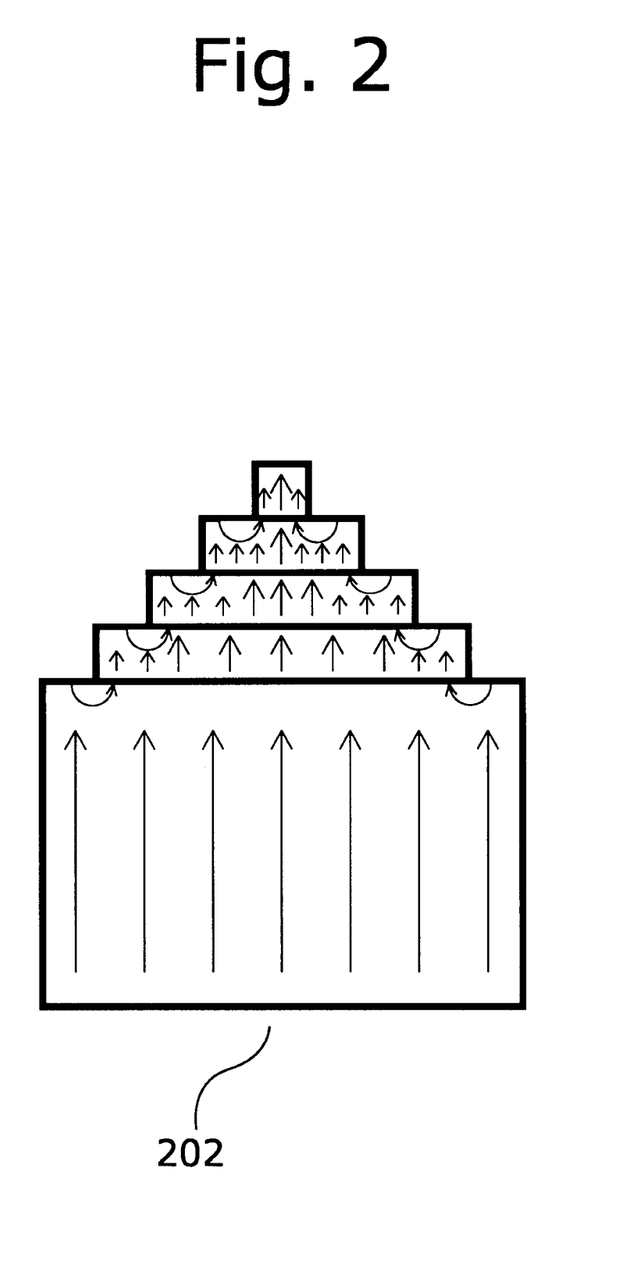
FIG. 2 shows step pyramid magnetic device and its magnetic flux flow.

FIG. 2 (step pyramid magnetic device and its magnetic flux flow) shows magnetic flux path within pyramidal magnet device 202. The result is much higher magnetic flux density at the top of pyramid then on its bottom.

Figure 3:
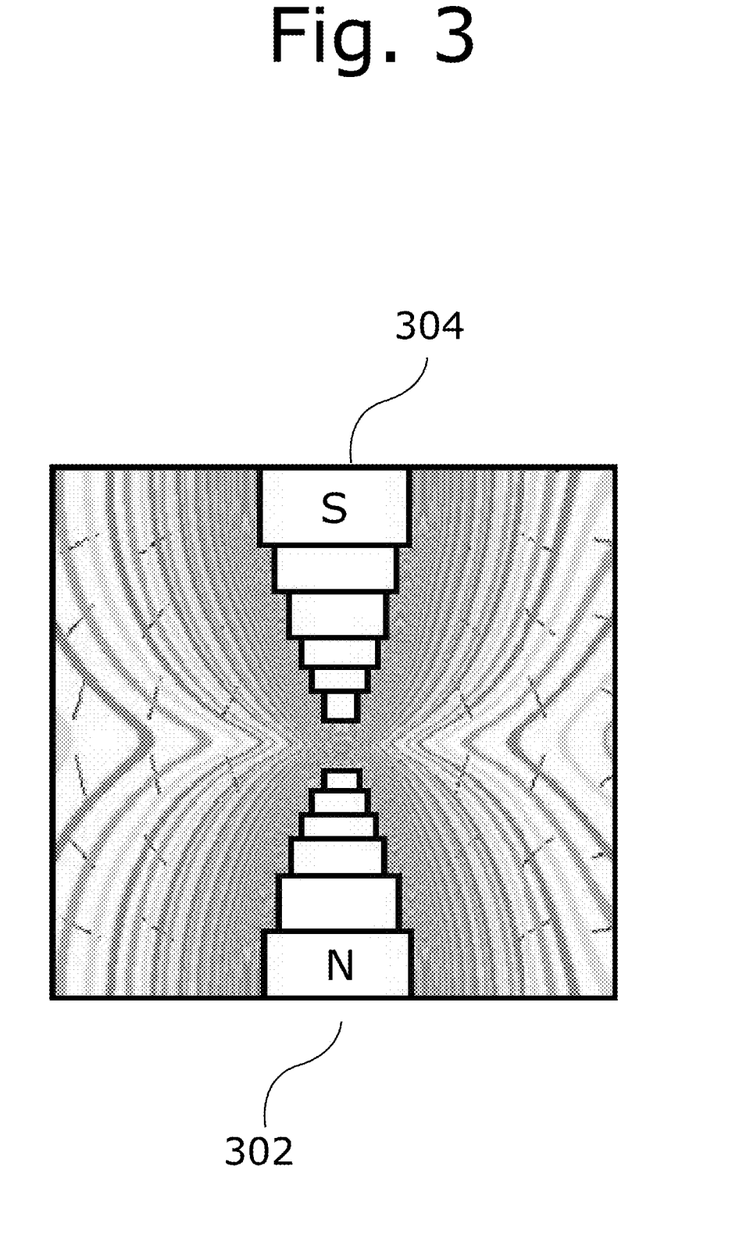
FIG. 3 shows the focused shape of magnetic flux flow through the air gap between the inner rotor's magnet north pole and the outer rotor's magnet south pole.

From Faraday's Law we see that only magnetic flux that goes through the inside of the wire loop in stator winding 106 induces the current in that wire. Magnetic flux that exists outside of the loop does not induce any current. To provide the solution where totality of the magnetic flux goes through the inside of the wire loops, proposed invention introduces magnet geometry which amplifies and concentrates magnetic flux to a very small area over the air gap between pole pairs. This is achieved by utilizing pyramidal (and/or step pyramidal) magnetic device shape. FIG. 3 (focused shape of magnetic flux flow through the air gap) provides simulation plot of how magnetic flux travels across the air gap between two opposing pyramidal magnetic devices (north pole tip 302 and south pole tip 304).

In preferred embodiment stator windings 106 are placed between opposing magnetic devices and perpendicular to magnetic flux flow lines as shown on FIG. 1.

As it can be seen from FIG. 3, most of the magnetic flux is focused to a very small area and very little is lost to propagate outside of the stator coil wire loop.

Guided Magnetic Flux Return Paths

Next problem to be solved is to create guided return paths of the magnetic flux to eliminate stray fields. This is achieved by employing two techniques. One is previously mentioned usage of pyramidal shape magnetic devices to concentrate the magnetic flux into the small area over pole pair's air gaps, so that dispersion of the field is minimized. The other one is usage of Halbach array arrangement of magnetic devices within each of the rotors (inner rotor 102 and outer rotor 104). That way the magnetic path is pre-determined and controlled by the geometry of the device.

Halbach Array

A Halbach array is a specific arrangement of a plurality of permanent magnetic devices. The array has a spatially rotating pattern of magnetism which cancels the field on one side, but boosts it on the other. This is accomplished by orienting said magnetic devices so that their poles are out of phase, typically, but not limited to, by 90 degrees, such that return paths are guided away from returning through the air. This helps with field confinement which is usually a problem in the design of magnetic structures, so that there is no stray field.

Figure 4:
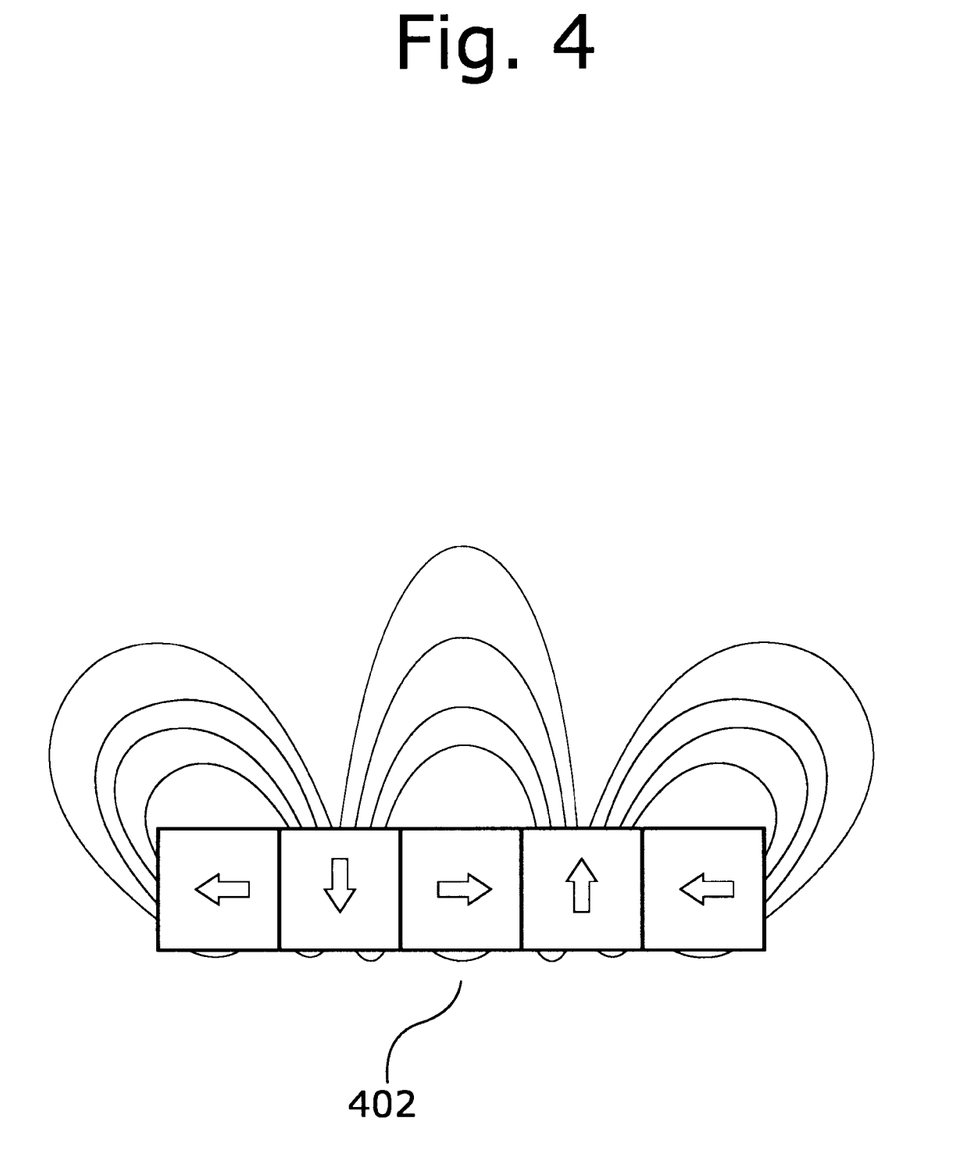
FIG. 4 shows Halbach array and its magnetic flux flow.

To better understand this principle FIG. 4 (Halbach array magnetic flux flow) shows one example of linear Halbach array 402 and how magnetic flux flows through such configuration. Construction of Halbach arrays is not limited to this particular Halbach array 402 construction, and can also be made by employing various magnetization patterns, using one or more Halbach magnetic devices with different angles of polarization.

This invention employs the same principle but in cylindrical configuration (FIG. 1).

In both, inner rotor 102 and outer rotor 104, magnetic flux is confined within the path predetermined by Halbach array configuration 402. Magnetic flux is then focused by pyramidal shaped magnetic devices 202 and propagates through stator windings 106 between inner rotor 102 and outer rotor 104 with minimal dispersion and loss.

Arrows show magnetic flux flow direction from south towards the north pole of the magnetic device. Magnetic flux flow paths are shown by arrows in FIG. 1.

Additional Embodiments—FIGS. 5-9

Additional embodiment is shown in FIGS. 5, 6, 7, 8 and 9.

Figure 5:
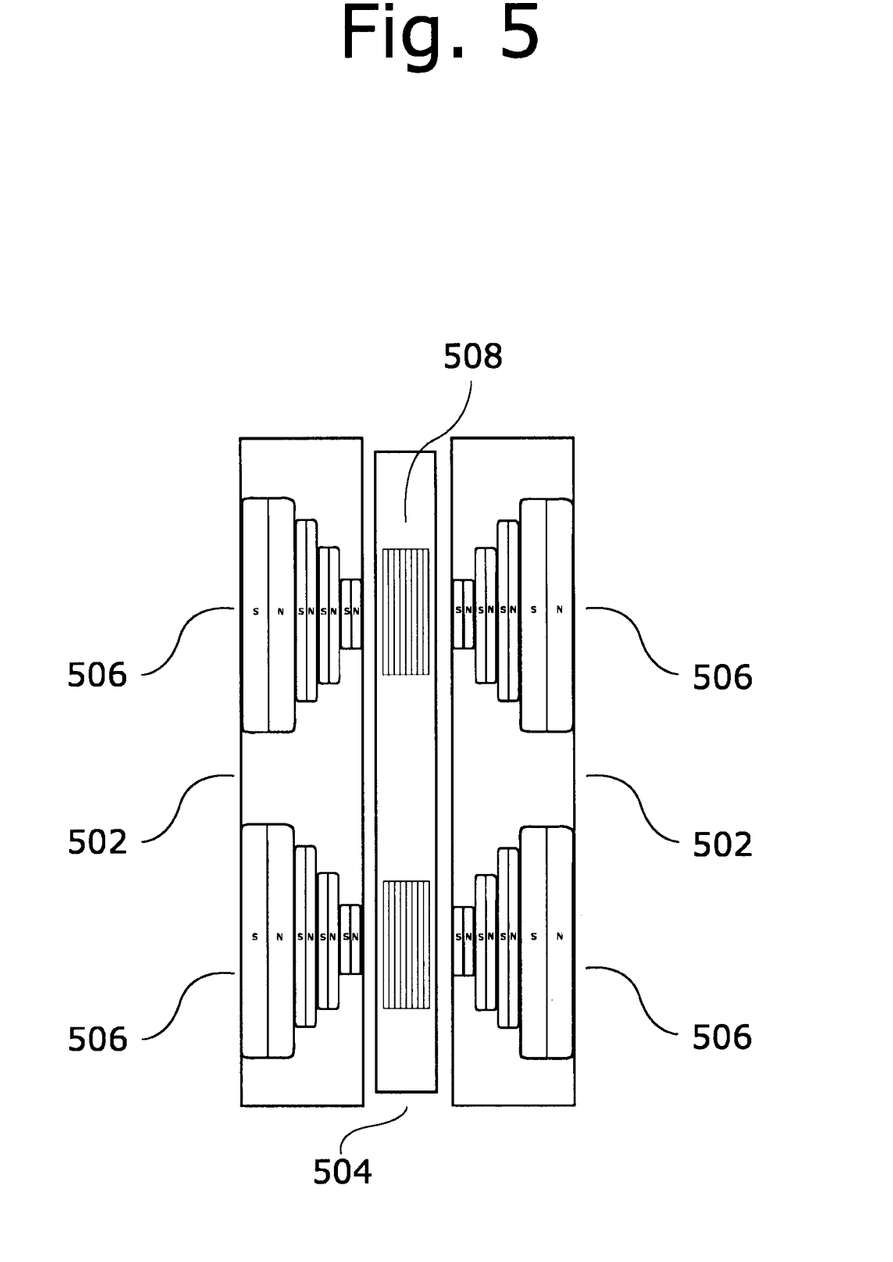
FIG. 5 shows components of axial Non-Cogging High Efficiency Electric Generator.

It comprises at least one dual rotor 502 and at least one stator 504. Dual rotor comprises two rotor halves, left half and right half respectively. FIG. 5 (axial Non-Cogging High Efficiency Electric Generator) shows the side crosscut of the axial configuration of the Non-Cogging High Efficiency Electric Generator embodiment. Stator 504 with stator windings 508 is sandwiched between two rotor halves of dual rotor 502. Only the placement of the pyramidal magnetic devices 506 is shown in FIG. 5 for the clarity of the drawing. Polarities of pyramidal magnetic devices 506 components are labeled as "N" for north pole and "S" for south pole. As it can be seen in FIG. 5, opposing magnetic polarity tips of the pyramidal magnetic devices 506 are facing each other, so that magnetic flux flows through the center of stator windings 508 with minimal dispersion.

Figure 6:
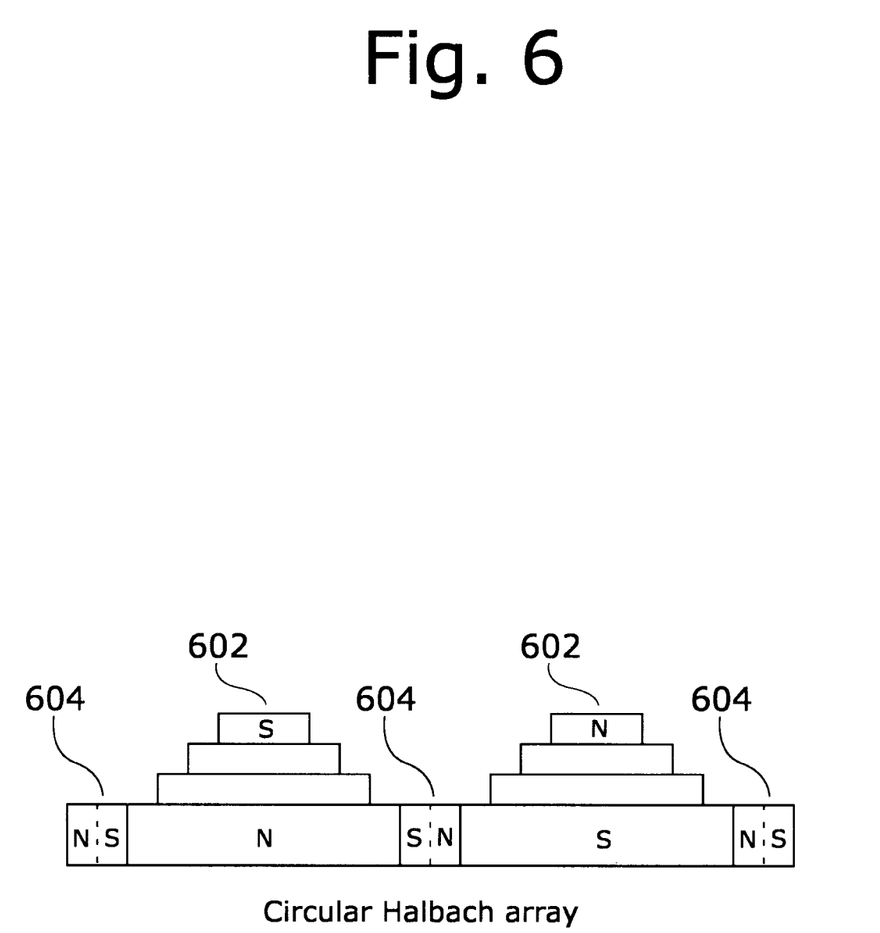
FIG. 6 shows axial generator step pyramid and Halbach magnets placement.

FIG. 6 (axial generator step pyramid and Halbach magnets placement) shows construction of one variation of Halbach array with pyramidal magnetic devices 602. Halbach magnetic device's 604 north pole is adjoining pyramidal magnetic device's 602 south pole at the base of the pyramidal magnetic device 602 and south pole of the Halbach magnetic device's is adjoining next pyramidal magnetic device's 602 north pole at the base of that pyramidal magnetic device 602. Such placement where opposite magnetic poles of Halbach magnetic devices 604 and bases of pyramidal magnetic devices 602 are adjoined is repeated until full circle is completed. Width of the Halbach magnetic devices 604 is equal, or smaller, or greater, to the thickness of the adjoined base of pyramidal magnetic devices 602.

Figure 7:
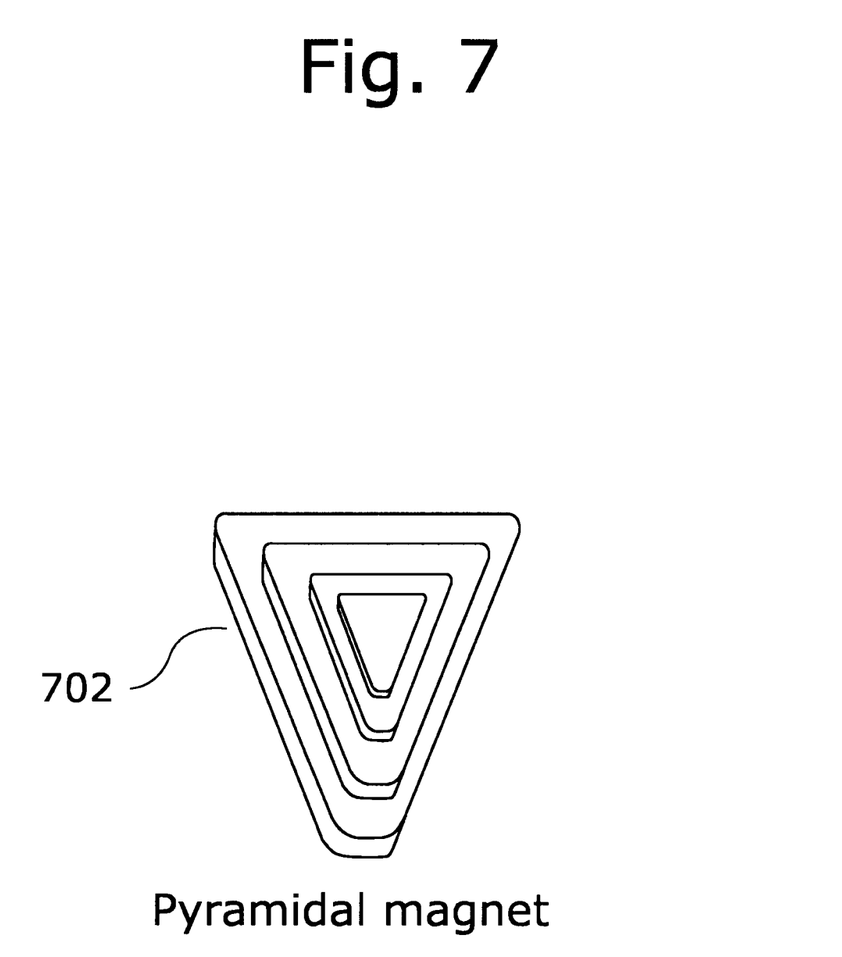
FIG. 7 shows step pyramid magnet construction.

FIG. 7 (step pyramid magnet construction) shows construction of step pyramidal magnetic device 702. Said step pyramidal magnetic device 702 is constructed from several flat magnets descending in size. Magnets are placed on top of each other in descending order to form larger base and smaller tip of said step pyramidal magnetic device 702. Such construction has the advantage of using cheaper magnets to form a complex structure, and individual magnets are electrically isolated from each other, thus stray eddy currents are additionally minimized.

Figure 8:
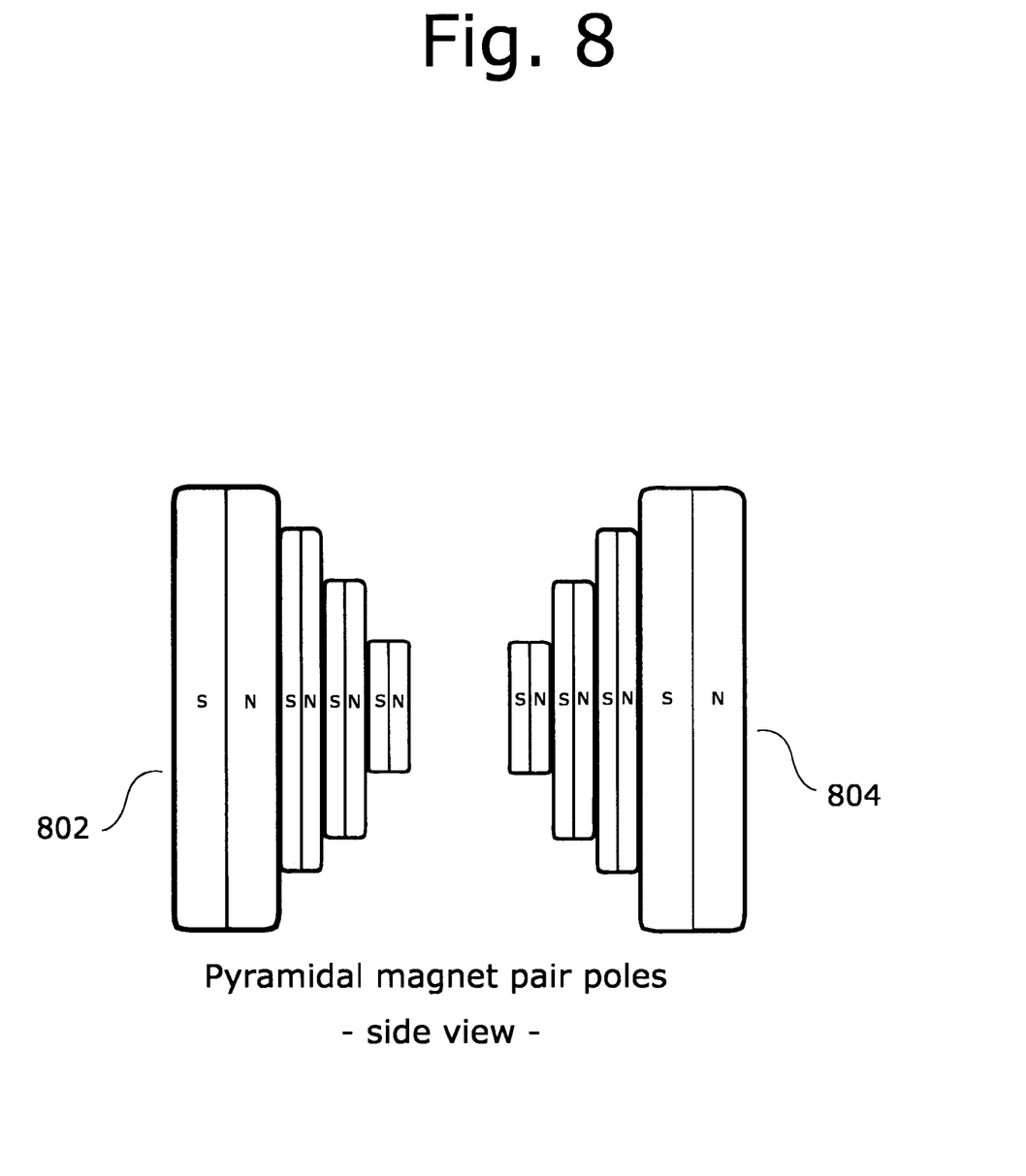
FIG. 8 shows step pyramid magnet pole pair construction.

FIG. 8 (step pyramid magnet pole pair construction) shows relative position of two opposing said pyramidal magnetic devices 506 to form a pole pair with strong magnetic field between their tips. North pole tip of pyramidal magnetic device 802 is located on one half of said dual rotor 502, while south pole tip pyramidal magnetic device 804 is located on the other half of said dual rotor 502, with said stator windings 508 in between.

Figure 9:
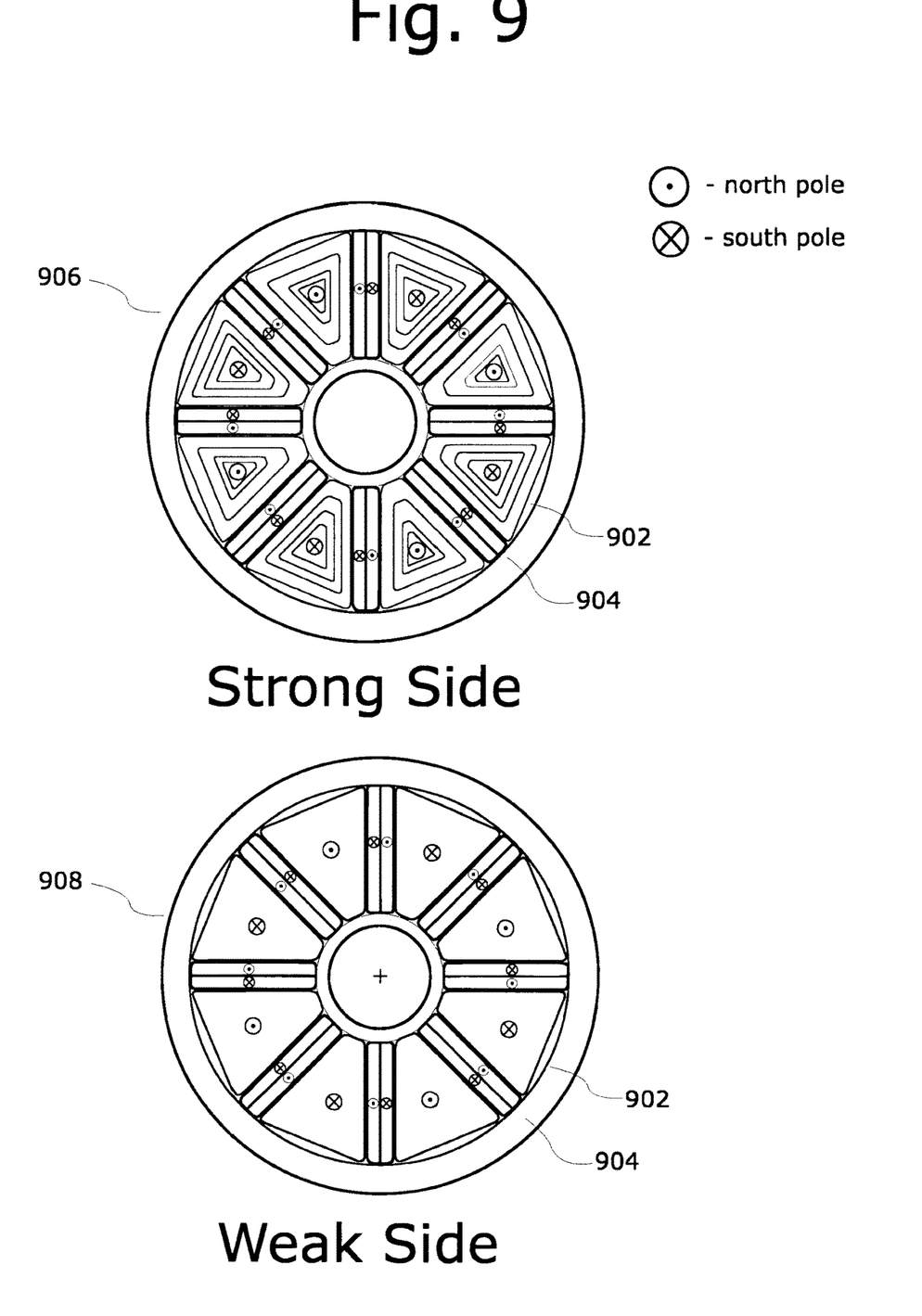
FIG. 9 shows circular Halbach array.

FIG. 9 (circular Halbach array) shows placement of pyramidal magnetic devices 902 and Halbach magnetic devices 904 in circular Halbach configuration. Strong sides 906 of dual rotors are facing each other with stator sandwiched between said rotor halves. Weak sides 908 of dual rotors are facing outwards, away from the stator. That way strong magnetic field is flowing through stator windings 508 and only the weak fields are dissipated as stray magnetic fields.

The operation of this Non-Cogging High Efficiency Electric Generator embodiment is the same as in the First Embodiment.

Alternative Embodiments

There are various possibilities with regard of utilizing construction of different types of generators. For example, multiple rotors and stators can be placed within a single generator unit.

Also, rotor and stator, or their parts, of said embodiments can also be made whole, or in part, of metallic or ferromagnetic materials, keeping in mind that such materials are prone to induction of eddy currents. While such generator would still be functional, it would diminish the efficiency of the generator.

Advantages

From the description above, a number of advantages of some embodiments of my Non-Cogging High Efficiency Electric Generator become evident:

(a) Elimination of variations in magnetic field, and minimization of stray magnetic fields by employing dual rotor configuration having inner and outer rotor of the first embodiment, or axial dual rotor of additional embodiment, rotating synchronously, so that opposing magnetic pyramidal poles remain always in the same relative position.

(b) Magnetic flux is routed utilizing circular Halbach array combined with pyramidal magnets, both mounted on said dual rotor, which results in concentration of magnetic flux at the tip of the magnetic pyramidal pole and minimization of stray magnetic fields. Such concentrated flux flows through the center of stator windings with minimal dispersion and loss.

(c) Dual rotor design with circular Halbach arrays does not require usage of steel, or iron, or any other ferromagnetic material (used in some designs to minimize stray magnetic fields of permanent magnets), thus resulting in lesser material density and mass. Such rotor design requires less force to sustain motion.

(d) Use of non-metallic materials for dual rotor design eliminates losses in rotor due to eddy currents, thus increases generator efficiency.

(e) Use of step pyramidal magnet design by stacking flat magnets in descending order to form larger base and smaller tip has the advantage of using cheaper magnets to form a complex structure. Such individual magnets are electrically isolated from each other, thus stray eddy currents within said magnets are minimized.

(f) Stator windings are wound on non-magnetic, non-metal, material so cogging interaction between dual rotor magnets and stator metal core is eliminated.

(g) Non-cogging and low operational torque requirement makes this generator ideal for usage with wind turbines, water turbines, steam turbines, wave power generation, Stirling engines, or any other mechanical system that generates rotational force.

CONCLUSIONS, RAMIFICATIONS AND SCOPE

Accordingly, the reader will see that at least one embodiment of the Non-Cogging High Efficiency Electric Generator provides more efficient power generation apparatus in installations where rotational force is generated. Such apparatus can be used in variety of domestic and industrial applications where rotational force generation is part of normal operation.

Furthermore, the Non-Cogging High Efficiency Electric Generator has the additional advantages in that:

It does not require usage of steel, or iron, or any other ferromagnetic material.

It can be produced by using-of-the-shelf magnets and molded plastic whose overall cost is less than the cost of materials of standard generators.

It provides maximum level of power conversion efficiency and best utilizes available resources.

It provides energy savings and cost reduction of having it in operation. Using energy-efficient generator reduces operating expenses and accelerates a return on investment.

It makes it ideal for usage with wind turbines, water turbines, steam turbines, wave power generation, Stirling engines, or any other mechanical system that generates rotational force.

An apparatus for power generation through rotational movement comprising: at least one stator and at least one dual rotor; a plurality of dual rotor pyramidal magnetic devices; a plurality of dual rotor Halbach magnetic devices; a plurality of stator windings; a magnetic means comprising said plurality of dual rotor pyramidal magnetic devices, and said plurality of dual rotor Halbach magnetic devices assembled in circular Halbach array configuration; said dual rotor comprising two rotor halves; said rotor halves comprising rotor body onto which said magnetic means are affixed; said stator comprising stator body onto which said plurality of stator windings are affixed; said plurality of stator windings is (i) electrically connected in series, or in parallel, or in star configuration, or in delta configuration, or dynamically varied configuration, or any other configuration that is determined by design specifications, (ii) is wound with single wires, double wires, litz wires, or any combination and number of wires determined by design specifications, (iii) can be dynamically switched to any configuration and/or number of series or parallel wires on the same winding if required by design specifications and working conditions; said pyramidal magnetic devices having pyramidal shape with broader base and taper to a pointed apex, or truncated apex; said pyramidal magnetic devices having shape of, but not limited to, pyramid, step pyramid, truncated pyramid, truncated step pyramid, conical, step conical, truncated conical, truncated step conical, tetrahedron, truncated tetrahedron, octahedron, truncated octahedron, arc, oloid, sphericon, or any other shape that tapers into pointed apex or truncated apex of the magnet pole; said Halbach magnetic devices having shape of, but not limited to, rectangular prism, square based prism, triangular based prism, trapezoid based prism, cube, or any other shape that can be tightly adjoined to the base of said pyramidal magnets; said pyramidal magnetic devices and said Halbach magnetic devices can be made of, but not limited to, ceramic permanent magnets, Alnico permanent magnets, samarium cobalt (SmCo) permanent magnets, neodymium iron boron (NdFeB) permanent magnets; said rotor halves of said dual rotor are facing each other so that said pyramidal magnetic devices with opposite magnetic poles on their apexes are across each other forming magnetic pole pairs; said stator is placed in between two rotor halves of said dual rotor; said dual rotor is capable of rotating around its center axis; said rotating magnetic means is capable of inducing electrical current in said stator windings.

The apparatus of where said pyramidal magnetic devices have shape of a step pyramid made of individual flatter magnets, such that said flatter magnets are placed on top of each other in descending order; or where pyramidal magnetic devices have shape of a raised base pyramid with its base having pedestal in shape of, but not limited to, rectangular based prism, square based prism, triangular based prism, cube, or any other shape that can be tightly adjoined to said Halbach magnetic devices.

A method for increasing efficiency of power generation through rotational movement comprising: at least one stator and at least one dual rotor; a plurality of dual rotor pyramidal magnetic devices; a plurality of dual rotor Halbach magnetic devices; a plurality of stator windings; a magnetic means comprising said plurality of dual rotor pyramidal magnetic devices, and said plurality of dual rotor Halbach magnetic devices assembled in circular Halbach array configuration;

said dual rotor comprising two rotor halves; said rotor halves comprising rotor body onto which said magnetic means are affixed; said stator comprising stator body onto which said plurality of stator windings are affixed; said plurality of stator windings is (i) electrically connected in series, or in parallel, or in star configuration, or in delta configuration, or dynamically varied configuration, or any other configuration that is determined by design specifications, (ii) is wound with single wires, double wires, litz wires, or any combination and number of wires determined by design specifications, (iii) can be dynamically switched to any configuration and/or number of series or parallel wires on the same winding if required by design specifications and working conditions; said pyramidal magnetic devices having pyramidal shape with broader base and taper to a pointed apex, or truncated apex; said pyramidal magnetic devices having shape of, but not limited to, pyramid, step pyramid, truncated pyramid, truncated step pyramid, conical, step conical, truncated conical, truncated step conical, tetrahedron, truncated tetrahedron, octahedron, truncated octahedron, arc, oloid, sphericon, or any other shape that tapers into pointed apex or truncated apex of the magnet pole; said Halbach magnetic devices having shape of, but not limited to, rectangular prism, square based prism, triangular based prism, trapezoid based prism, cube, or any other shape that can be tightly adjoined to the base of said pyramidal magnets; said pyramidal magnetic devices and said Halbach magnetic devices can be made of, but not limited to, ceramic permanent magnets, Alnico permanent magnets, samarium cobalt (SmCo) permanent magnets, neodymium iron boron (NdFeB) permanent magnets; said rotor halves of said dual rotor are facing each other so that said pyramidal magnetic devices with opposite magnetic poles on their apexes are across each other forming magnetic pole pairs; said stator is placed in between two rotor halves of said dual rotor; said dual rotor is capable of rotating around its center axis; whereby (i) said rotating magnetic means is capable of inducing electrical current in said stator windings, (ii) said dual rotor and said stator bodies are made of non-magnetic, light materials, thus eliminating cogging and eddy currents, and require less rotational force to start and maintain rotation, thus increase mechanical and overall efficiency of said apparatus.

An apparatus for power generation through rotational movement comprising a plurality of pyramidal magnetic devices and a plurality of Halbach magnetic devices forming dual circular Halbach array such that said apparatus is not utilizing any iron, steel or other ferromagnetic materials, resulting in elimination of cogging and eddy current loses within iron, steel or ferromagnetic cores.

Although the description above contains many specifics, these should not be construed as limitations of the scope, but rather as an exemplification of one [or several] embodiment(s) thereof. Many other variations are possible. Accordingly, the scope should be determined not by the embodiment(s) illustrated, but by the appended claims and their legal equivalents.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the title, headings, terms and phrases used herein are not intended to limit the subject matter or scope; but rather, to provide an understandable description of the invention. The invention is composed of several sub-parts that serve as portion of the total functionality of the invention independently and contribute to system level functionality when combined with other parts of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not to be interpreted as a "means" or "step" clause as specified in 35 U.S.C. Sec. 112, Parag. 6. In particular, the use of "step of" in the claims herein is not intended to invoke the provisions of 35 U.S.C. Sec. 112, Parag. 6. Incorporation of Reference: All research papers, publications, patents, and patent applications mentioned in this specification are herein incorporated by reference to the same extent as if each individual publication, patent, or patent appl. was specifically and individually indicated to be incorporated by reference.

I claim:

1. An apparatus for power generation through rotational movement comprising:
   at least one stator and at least one dual rotor;
   a plurality of dual rotor pyramidal magnetic devices;
   a plurality of dual rotor Halbach magnetic devices;
   a plurality of stator windings; a magnetic means comprising said plurality of dual rotor pyramidal magnetic devices, and said plurality of dual rotor Halbach magnetic devices assembled in circular Halbach array configuration;
   said dual rotor comprising two rotor halves;
   said rotor halves comprising rotor body onto which said magnetic means are affixed;
   said stator comprising stator body onto which said plurality of stator windings are affixed;
   said plurality of stator windings is (i) electrically connected in series, or in parallel, or in star configuration, or in delta configuration, or dynamically varied configuration, (ii) is wound with single wires, double wires, or litz wires, (iii) can be dynamically switched to any configuration and/or number of series or parallel wires on the same winding;
   said pyramidal magnetic devices having pyramidal shape with broader base and taper to a pointed apex, or truncated apex;
   said pyramidal magnetic devices having shape of pyramid, step pyramid, truncated pyramid, truncated step pyramid, conical, step conical, truncated conical, truncated step conical, tetrahedron, truncated tetrahedron, octahedron, truncated octahedron, arc, oloid, sphericon, or any other shape that tapers into pointed apex or truncated apex of the magnet pole;
   said Halbach magnetic devices having shape of rectangular prism, square based prism, triangular based prism, trapezoid based prism, cube, or any other shape that can be tightly adjoined to the base of said pyramidal magnets;
   said pyramidal magnetic devices and said Halbach magnetic devices can be made of ceramic permanent magnets, Alnico permanent magnets, samarium cobalt (SmCo) permanent magnets, neodymium iron boron (NdFeB) permanent magnets;

said rotor halves of said dual rotor are facing each other so that said pyramidal magnetic devices with opposite magnetic poles on their apexes are across each other forming magnetic pole pairs;

said stator is placed in between two rotor halves of said dual rotor; and said dual rotor is capable of rotating around its center axis; whereby said rotating magnetic means is capable of inducing electrical current in said stator windings.

2. The apparatus of claim 1 where said pyramidal magnetic devices have shape of a step pyramid made of individual flatter magnets, such that said flatter magnets are placed on top of each other in descending order.

3. The apparatus of claim 1 where said pyramidal magnetic devices have shape of a raised base pyramid with its base having pedestal in shape of rectangular based prism, square based prism, triangular based prism, cube, or any other shape that can be tightly adjoined to said Halbach magnetic devices.

4. An apparatus for increasing efficiency of power generation through rotational movement comprising:

at least one stator and at least one dual rotor;

a plurality of dual rotor pyramidal magnetic devices;

a plurality of dual rotor Halbach magnetic devices;

a plurality of stator windings; a magnetic means comprising said plurality of dual rotor pyramidal magnetic devices, and said plurality of dual rotor Halbach magnetic devices assembled in circular Halbach array configuration;

said dual rotor comprising two rotor halves;

said rotor halves comprising rotor body onto which said magnetic means are affixed; said stator comprising stator body onto which said plurality of stator windings are affixed;

said plurality of stator windings is (i) electrically connected in series, or in parallel, or in star configuration, or in delta configuration, or dynamically varied configuration, (ii) is wound with single wires, double wires, or litz wires, (iii) can be dynamically switched to any configuration and/or number of series or parallel wires on the same winding;

said pyramidal magnetic devices having pyramidal shape with broader base and taper to a pointed apex, or truncated apex;

said pyramidal magnetic devices having shape of, pyramid, step pyramid, truncated pyramid, truncated step pyramid, conical, step conical, truncated conical, truncated step conical, tetrahedron, truncated tetrahedron, octahedron, truncated octahedron, arc, oloid, sphericon, or any other shape that tapers into pointed apex or truncated apex of the magnet pole;

said Halbach magnetic devices having shape of rectangular prism, square based prism, triangular based prism, trapezoid based prism, cube, or any other shape that can be tightly adjoined to the base of said pyramidal magnets;

said pyramidal magnetic devices and said Halbach magnetic devices can be made of ceramic permanent magnets, Alnico permanent magnets, samarium cobalt (SmCo) permanent magnets, neodymium iron boron (NdFeB) permanent magnets;

said rotor halves of said dual rotor are facing each other so that said pyramidal magnetic devices with opposite magnetic poles on their apexes are across each other forming magnetic pole pairs;

said stator is placed in between two rotor halves of said dual rotor; and said dual rotor is capable of rotating around its center axis; whereby (i) said rotating magnetic means is capable of inducing electrical current in said stator windings, (ii) said dual rotor and said stator bodies are made of non-magnetic, light materials, thus eliminating cogging and eddy currents, and require less rotational force to start and maintain rotation, thus increase mechanical and overall efficiency of said apparatus.

5. An apparatus for power generation through rotational movement comprising:

a plurality of pyramidal magnetic devices and a plurality of Halbach magnetic devices forming dual circular Halbach array such that said apparatus is not utilizing any iron, steel or other ferromagnetic materials, resulting in elimination of cogging and eddy current loses within iron, steel or ferromagnetic cores.

* * * * *